June 15, 1943.　　　J. A. BARACSKAI　　　2,321,888
GAUGE
Filed Feb. 26, 1942　　　3 Sheets-Sheet 1

Inventor
Joseph A. Baracskai

By Clarence A. O'Brien
and Harvey B. Jacobson
Attorneys

June 15, 1943.  J. A. BARACSKAI  2,321,888
GAUGE
Filed Feb. 26, 1942  3 Sheets-Sheet 2
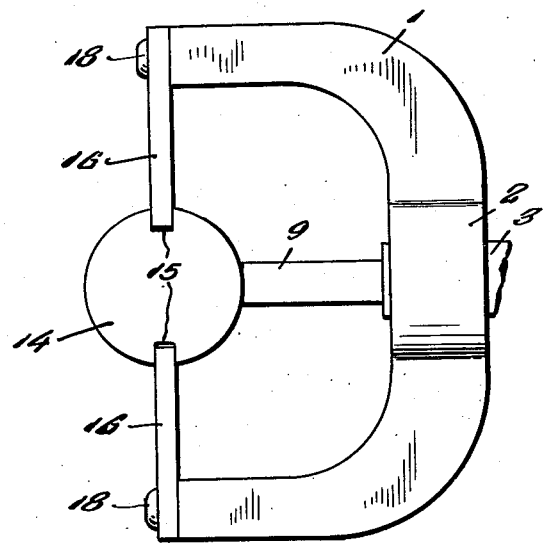
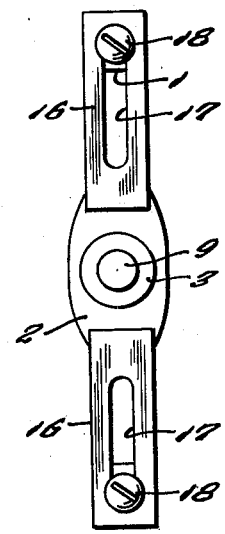
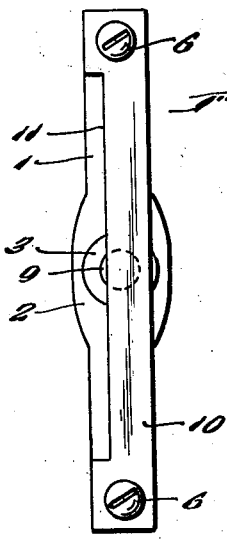
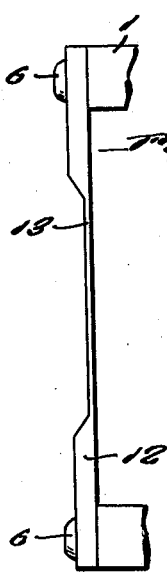
Inventor
Joseph A. Baracskai
By Clarence A. O'Brien
and Harvey B. Jacobson
Attorneys

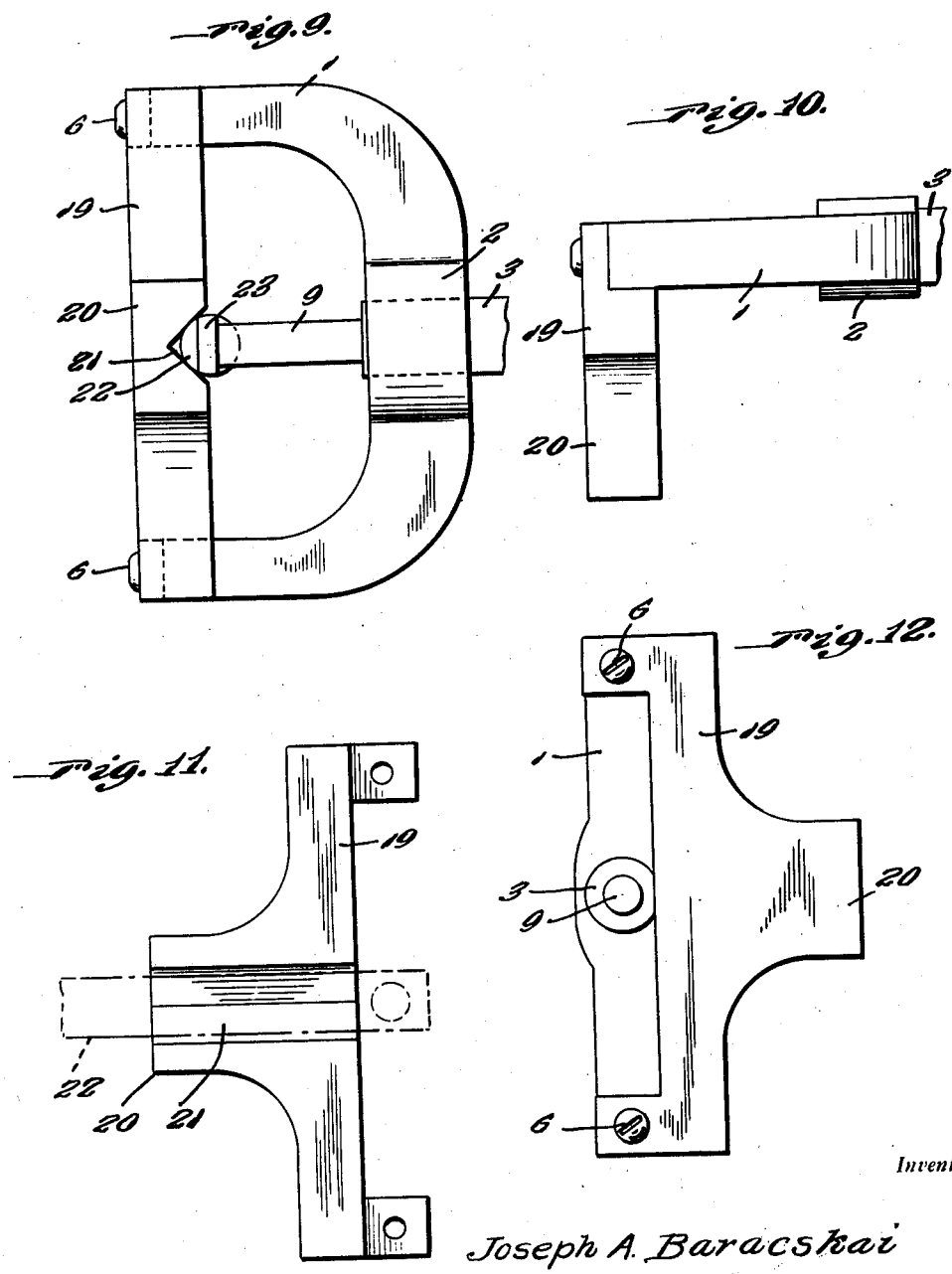

Patented June 15, 1943

2,321,888

UNITED STATES PATENT OFFICE 2,321,888

GAUGE

Joseph A. Baracskai, Elyria, Ohio

Application February 26, 1942, Serial No. 432,519

2 Claims. (Cl. 33—167)

The present invention relates to new and useful improvements in gauges, and has for its primary object to provide, in a manner as hereinafter set forth, an instrument of this character comprising a novel construction and arrangement whereby end and longitudinal grooves in shafts, tangs, et cetera, may be expeditiously and accurately checked for center.

Another very important object of the invention is to provide a gauge of the aforementioned character which is adapted to be used in conjunction with a substantially conventional micrometer barrel.

Other objects of the invention are to provide a gauge of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a view in front elevation, showing the form of work engaging bar which is used in shallow end grooves.

Figure 5 is a view in side elevation, showing the form of bar which is used in very narrow end grooves.

Figure 6 is a view in side elevation of a modification for use in longitudinal grooves.

Figure 7 is a view in front elevation of the modification shown in Figure 6.

Figure 8 is a detail view in perspective of one of the longitudinal groove engaging members.

Figure 9 is a view in side elevation of a modification for use on tangs.

Figure 10 is a top plan view thereof.

Figure 11 is a rear elevational view.

Figure 12 is a view in front elevation.

Figure 1:
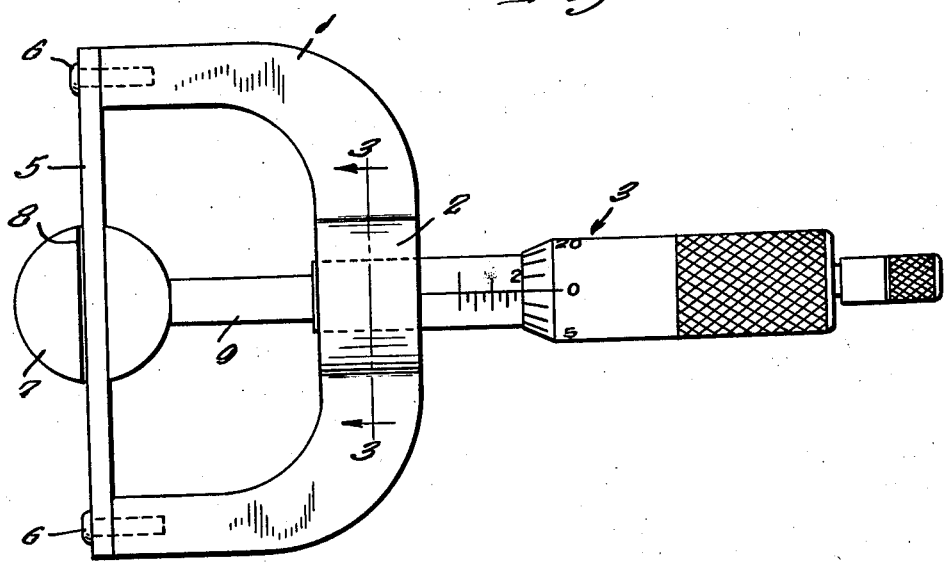
Figure 1 is a view in side elevation of a gauge constructed in accordance with the present invention.
Figure 2:
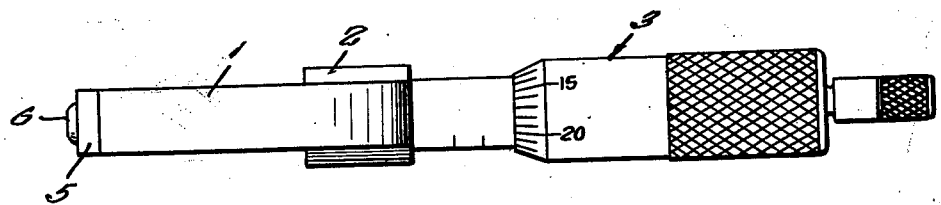
Figure 2 is a plan view of the device.
Figure 3:
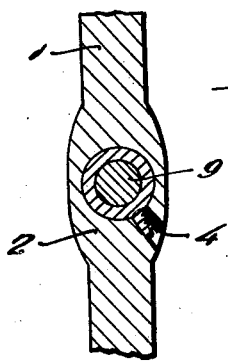
Figure 3 is a fragmentary view in vertical section, taken substantially on the line 3—3 of Figure 1.

Referring now to the drawings in detail, and to Figures 1, 2 and 3 thereof in particular, it will be seen that reference numeral 1 designates a substantially U-shaped frame of suitable metal and dimensions. At an intermediate point, the substantially U-shaped frame 1 is formed to provide an eye 2. The eye 2 is for the reception of a micrometer barrel which is designated generally by reference numeral 3. A set screw 4 (see Fig. 3) secures the micrometer barrel 3 in the eye 2.

Mounted on the ends of the substantially U-shaped frame 1 is a metallic bar 5. Screws 6 secure the bar 5 in position on the ends of the frame 1. Of course, any other suitable means may be provided for accomplishing this.

In Figure 1 of the drawings, a piece of work in the form of a shaft is indicated at 7. The end of the shaft 7 which is seen has formed therein a diametrically extending groove or channel 8.

It is thought that the manner of using the instrument will be readily apparent from a consideration of the foregoing. The bar 5 and the free end of the movable spindle 9 of the micrometer barrel 3 are perfectly parallel. This is essential for accuracy. The bar 5 is engaged in the groove 8 and the micrometer barrel 3 is adjusted to engage the movable spindle 9 with one side of the shaft 7. A reading of the micrometer scale is taken and the instrument is reversed on the work. That is, the bar 5 is again engaged in the groove 8 and the spindle 9 is brought into engagement with the opposite side of the work. Another reading is taken and compared with the first. In this manner the precise location of the groove 8 in the shaft 7 may be readily ascertained.

In Figure 4 of the drawings, reference numeral 10 designates a bar which is intended for use particularly in shallow grooves. The bar 10 comprises a cut-away side portion 11. The cutout 11 permits the spindle 9 to be brought into proper engagement with the work before the bar 10 engages the bottom of the comparatively shallow groove.

In Figure 5 of the drawings, a bar for engagement in extremely narrow grooves is indicated at 12. The bar 12 comprises an intermediate cutaway front portion 13 which reduces the thickness of said bar to permit it to enter narrow grooves while retaining sufficiently strong or heavy end portions.

The modification illustrated in Figures 6 to 8, inclusive, of the drawings is for use on a shaft 14 having longitudinal grooves 15 therein. Toward this end, spaced aligned bars 16 of suitable metal are secured on the ends of the frame 1. The bars 16 receive the shaft 14 between their inner ends, which inner ends are engageable in the grooves 15. Slots 17 in the bars 16, which accommodate the securing screws 18, permit adjustment of said bars to accommodate different sizes of shafts.

In that form of the invention which is shown in Figures 9 to 12, inclusive, of the drawings, a bar 19 is mounted on the end portions of the frame 1 on one side thereof. Projecting from the bar 19 at an intermediate point is an integral arm 20 having a substantially V-shaped groove or channel 21 therein. The channel 21 is for the reception of a shaft 22 having a longitudinally projecting tang 23 thereon.

To use the modification of Figures 9 to 12, inclusive, of the drawings, one side of the shaft 22 is engaged in the channel 21 and the spindle 9 is engaged with the opposite side of the tang 23. After a reading has been taken, the instrument is reversed on the work and another reading is taken and compared with the first reading. Thus, the position of the tang 23 on the shaft 22 may be ascertained.

It is believed that the many advantages of a gauge constructed in accordance with the present invention will be readily understood, and although preferred embodiments of the instrument are as illustrated and described, it is to be understood that further modifications and changes in the details of construction may be resorted to which will fall within the scope of the invention as claimed.

What is claimed is:

1. A gauge of the character described comprising a substantially U-shaped frame, a bar mounted on the end portions of said frame, an arm on the bar having a substantially V-shaped channel therein for the reception of a piece of work, and a micrometer barrel mounted on the frame at right angles to the bar and engageable with the work.

2. A gauge of the character described comprising a substantially U-shaped frame including an eye at an intermediate point, a bar mounted on the end portions of said frame, a laterally extending arm on the bar at an intermediate point, said arm having a substantially V-shaped channel therein for the reception of a piece of work, a micrometer barrel mounted in the eye at right angles to the bar, said micrometer barrel being operatively engageable with the work in the channel.

JOSEPH A. BARACSKAI.